United States Patent
Lee et al.

(10) Patent No.: US 8,767,624 B2
(45) Date of Patent: Jul. 1, 2014

(54) CONTROL METHOD AND SYSTEM IN A COMMUNICATION SYSTEM

(75) Inventors: Sung-Won Lee, Gyeonggi-do (KR); Young-Ky Kim, Seoul (KR); Poong-Ki Min, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 146 days.

(21) Appl. No.: 13/237,464

(22) Filed: Sep. 20, 2011

(65) Prior Publication Data

US 2012/0008537 A1    Jan. 12, 2012

Related U.S. Application Data

(62) Division of application No. 11/865,480, filed on Oct. 1, 2007, now abandoned.

(30) Foreign Application Priority Data

Sep. 30, 2006 (KR) .................. 10-2006-0096685
Apr. 27, 2007 (KR) .................. 10-2007-0041644

(51) Int. Cl.
*H04W 4/00* (2009.01)
(52) U.S. Cl.
USPC .......... 370/328; 455/127.5; 455/522; 455/574
(58) Field of Classification Search
None
See application file for complete search history.

(56) References Cited

U.S. PATENT DOCUMENTS

| | | | |
|---|---|---|---|
| 5,918,177 | A | 6/1999 | Corriveau et al. |
| 2002/0039892 | A1 | 4/2002 | Lindell |
| 2004/0259542 | A1 | 12/2004 | Viitamaki et al. |
| 2004/0262384 | A1 | 12/2004 | Nishida et al. |
| 2005/0099992 | A1 | 5/2005 | Sato |
| 2005/0119992 | A1 | 6/2005 | Martino |
| 2005/0173509 | A1 | 8/2005 | Miettinen |
| 2006/0089161 | A1 | 4/2006 | Kim et al. |

FOREIGN PATENT DOCUMENTS

| | | |
|---|---|---|
| EP | 0 578 457 | 1/1994 |
| EP | 1 463 348 | 9/2004 |
| GB | 2 316 837 | 3/1998 |
| GB | 2 326 051 | 12/1998 |
| GB | 2 361 606 | 10/2001 |
| GB | 2 379 365 | 3/2003 |
| JP | 6-224801 | 8/1994 |
| KR | 1020050014620 | 2/2005 |
| KR | 1020060076163 | 7/2006 |
| WO | WO 98/24849 | 6/1998 |
| WO | WO 9824249 | 6/1998 |

OTHER PUBLICATIONS

European Search Report dated Sep. 23, 2011 in a counterpart application No. 07253882.0-2412.

*Primary Examiner* — Ayaz Sheikh
*Assistant Examiner* — Blanche Wong
(74) *Attorney, Agent, or Firm* — The Farrell Law Firm, P.C.

(57) ABSTRACT

A power control method by a mobile station (MS) in a communication system. In the power control method, the MS receives data while activating a first communication module for performing a wireless communication by supplying power to the first communication module, and performs data transmission/reception with an MS-assistant device interacting with the MS, if the received data is voice data.

14 Claims, 14 Drawing Sheets

CONTROL METHOD AND SYSTEM IN A COMMUNICATION SYSTEM

PRIORITY

This application is a Divisional Application of U.S. patent application Ser. No. 11/865,480 filed in the U.S. Patent and Trademark Office on Oct. 1, 2007, and this application claims priority under 35 U.S.C. §119(a) to a Korean Patent Application filed in the Korean Intellectual Property Office on Sep. 30, 2006 and assigned Serial No. 2006-96685, and a Korean Patent Application filed in the Korean Intellectual Property Office on Apr. 27, 2007 and assigned Serial No. 2007-41644, the contents of each of which are incorporated herein by reference.

BACKGROUND OF THE INVENTION

1. Field of the Invention

The present invention generally relates to a communication system, and in particular, to a control method and system for providing communication services to users at high speed in a communication system that provides communication services of various types to users.

2. Description of the Related Art

In general communication systems, power consumption of a Mobile Station (MS) acts as an important factor of the entire system. Therefore, an idle mode operation and a corresponding active mode operation of an MS have been proposed to minimize power consumption of the MS. Generally, when an MS has no data to exchange with a Radio Access Station (RAS) while the communication system is providing a communication service to a user in the active mode, the MS transitions from the active mode to the idle mode in an operation mode by performing a de-registration operation. However, when the RAS has a service to provide to the MS while the MS operates in the idle mode, the RAS sends a Mobile_Paging-Advertisement (MOB_PAG-ADV) message, or a paging message, to the MS, so the MS transitions to the active mode. An MOB_PAG-ADV message, as used herein, refers to a broadcasting message that an RAS sends to all associated MSs in a broadcasting manner, and the RAS uses a Media Access Control (MAC) address hash value of a corresponding MS among the MSs receiving the MOB_PAG-ADV message to notify the associated MS whether the MS will transition from the idle mode to the active mode. The MS that will transition to the active mode upon receipt of the MOB_PAG-ADV message previously activates, to the active state, application programs of all communication service types supportable by the MS to receive data from the RAS. That is, upon receipt of the MOB_PAG-ADV message from the RAS, the MS activates application programs of all service types so that the MS can receive all available communication services associated with the RAS. Thereafter, upon receipt of data of a particular service type from the RAS after activating application programs of all service types as described above, the MS detects a service type of the received data, and then receives a communication service through use of an application program corresponding to the detected service type.

In a communication system as described above, various functions using communication technology for an MS tend to be implemented and united in the MS. Therefore, such an MS typically includes therein modules for performing various functions. For example, an MS may be configured as a Personal Computer (PC) such as laptop, a Personal Digital Assistant (PDA), a notebook PC, a Portable Multimedia Player (PMP), an Ultra Mobile PC (UMPC), etc. In addition, an MS can further include a separate external MS-assistant communication module operating in association with the MS, for example, can include headset, small communication MS, etc.

An above-described MS typically keeps a Power-On State and supplies power to all modules of the MS during a communication service. If a communication function ends after the communication service through the MS expires, the MS normally performs a Power-Off operation, or transitions to a Power Save state. This is to take into account a limited power resource, i.e. limited battery power, of the MS.

When a user of an MS desires to receive a communication service using the MS, he/she should transition to the Power-On State by supplying again power to the MS, and in the communication system, there is an increasing tendency that the MS needs to always operate in a Power-On State.

As described above, when an RAS has a communication service to provide to a MS, i.e. has data of a particular service type to transmit to the MS, the RAS sends a MOB_PAG-ADV message to activate application programs of all service types included in the MS, causing unnecessary waste of power of the communication system, especially the MS.

In addition, in order to smoothly receive the communication service, the RAS and the MS should operate in the Power-On State, and power is continuously supplied even to the unused modules, causing unnecessary power waste. Therefore, a need exists for a control method and system for controlling power of an MS in a communication system.

SUMMARY OF THE INVENTION

The present invention substantially addresses at least the above-described problems and/or disadvantages and provides at least the advantages described below. Accordingly, an aspect of the present invention is to provide a control method and system in a communication system.

Another aspect of the present invention is to provide a control method and system for controlling power of an MS in a communication system.

Another aspect of the present invention is to provide a control method and system for providing a communication service without power waste in a communication system supporting communication services of various types.

According to one aspect of the present invention, there is provided a power control method of an MS in a communication system. The power control method includes receiving data while activating a first communication module for performing wireless communication by supplying power to the first communication module, and performing data transmission/reception with an MS-assistant device interacting with the MS, when the received data is voice data.

According to another aspect of the present invention, there is provided an MS in a communication system. The MS includes a first communication module for performing a wireless communication, a second communication module for communicating with an MS-assistant device interacting with the MS, and a control module for receiving data while activating the first communication module for data transmission/reception by supplying power to the first communication module, and performing data transmission/reception with the MS-assistant device, when the received data is voice data.

BRIEF DESCRIPTION OF THE DRAWINGS

The above and other aspects, features and advantages of the present invention will become more apparent from the following detailed description when taken in conjunction with the accompanying drawings in which.

Similar reference characters denote corresponding features consistently throughout the drawings.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention provides a control method and system in a communication system.

The present invention, as described below, provides a control method and system in a communication system, for example, in an Institute of Electrical and Electronics Engineers (IEEE) 802.16 communication system, which is a Broadband Wireless Access (BWA) communication system. The BWA communication systems described below provide communication services of various types to users, and also provides high-speed communication services having various Quality of Service (QoS) classes. Although the present invention described below refers to IEEE 802.16 communication systems, by way of example, the control method and system provided by the present invention can also be applied to other communication systems.

In addition, the present invention provides a control method and system between a Mobile Station (MS) and a Radio Access Station (RAS) serving as a Base Station (BS) in a communication system. For example, the present invention, described below, provides a control method and system in which when an RAS has data to transmit to an MS, i.e. has a communication service to provide to a user, while the MS and the RAS are operating in the idle mode, the RAS sends a Mobile_Paging-Advertisement (MOB_PAG-ADV) message, or a paging message, to the MS in order to minimize power consumption of the MS.

The MOB_PAG-ADV message includes service information corresponding to a service type of the data to be transmitted to the MS. In the idle mode, the MS receives a MOB_PAG-ADV message including service information corresponding to a service type of the data to be transmitted to the MS itself, thereby recognizing a service type of the data to be transmitted upon transition of the MS from the idle mode to the active mode. As a result, when the MS makes transition to the active mode, the MS previously activates, to the active state, only the application corresponding to the recognized service type among the applications of all communication service types supportable by the MS to receive data from the RAS. That is, upon receipt of a MOB_PAG-ADV message including service information corresponding to a service type of its data to be transmitted from the RAS, the MS activates an application corresponding to the service type to receive a communication service by receiving data of a particular service type to be transmitted by the RAS. Upon receipt of data of the particular service type from the RAS after activating the application of the service type corresponding to the service information included in the MOB_PAG-ADV message, the MS receives a communication service through use of the activated application.

Figure 1:
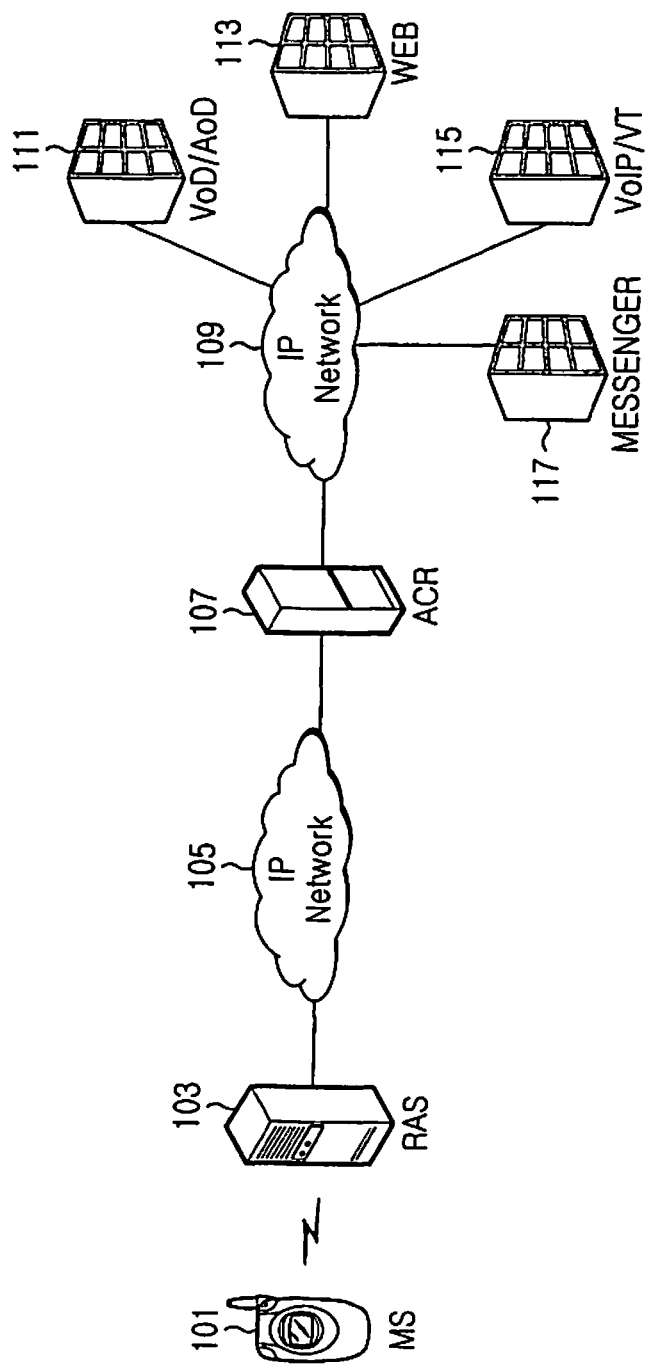
FIG. 1 is a block diagram of a communication system according to the present invention.

In this manner, in a communication system according to the present invention, when the RAS has a communication service to provide to the MS, i.e. has data of a particular service type to transmit to the MS, the RAS sends to the MS a MOB_PAG-ADV message including service information corresponding to the service type of the transmission data, and upon receipt of the MOB_PAG-ADV message, the MS can activate only the application of the service type corresponding to the service information, i.e. only the application corresponding to the service type of the data to be transmitted by the RAS, thereby preventing unnecessary waste of power and memory of the communication system, especially the MS. In addition, the MS, because it recognizes a service type of the data to be transmitted by the RAS by receiving the MOB_PAG-ADV message, can share only the resource corresponding to the transmission data, thereby preventing resource waste. When the communication system provides a communication service to the user, in other words, when there is data exchange between the RAS and the MS, the MS previously activates an application corresponding to the data to be exchanged, thereby facilitating fast data transmission/reception. With reference to FIG. 1, a description will now be made of an example of a communication system according to the present invention.

FIG. 1 shows a communication system according to the present invention.

In FIG. 1, the communication system includes an MS 101 for making an access to the communication system to receive a communication service, an RAS 103, serving as a BS as described above, for exchanging data with the MS 101, an Access Control Router (ACR) 107, an Internet Protocol (IP)-connected to the RAS 103 via an IP network 105, for controlling the RAS 103, and servers, IP-connected to the ACR 107 via an IP network 109, for providing a communication service to the MS 101 via the ACR 107, for example, a Video on Demand and Audio on Demand (VoD/AoD) server 111 for providing video and audio services, a web server 113 for providing an Internet web service, a Voice over IP and Virtual Terminal (VoIP/VT) server 115 for providing voice and image services, and a messenger server 117 for providing an Instant Messaging (IM) service.

The RAS 103 processes a wireless access standard with the MS 101 accessing the communication system, i.e. processes the IEEE 802.16 standard, because the communication system herein is assumed to be an IEEE 802.16 communication system, and performs a function of the BS, i.e. performs an initial procedure for exchanging data with the MS 101 and a data transmission/reception function. In other words, the RAS 103 performs Radio Frequency (RF) signal processing with the MS 101, performs functions in a Physical (PHY) layer and a Media Access Control (MAC) layer, and performs scheduling and ranging operation with the MS 101. In addition, the RAS 103 transmits, to the MS 101, initialization and communication system information of the cell capable of receiving a communication service therefrom, and controls inter-sector handoff of the MS 101 when the MS 101 moves between sectors in the cell.

Figure 2:
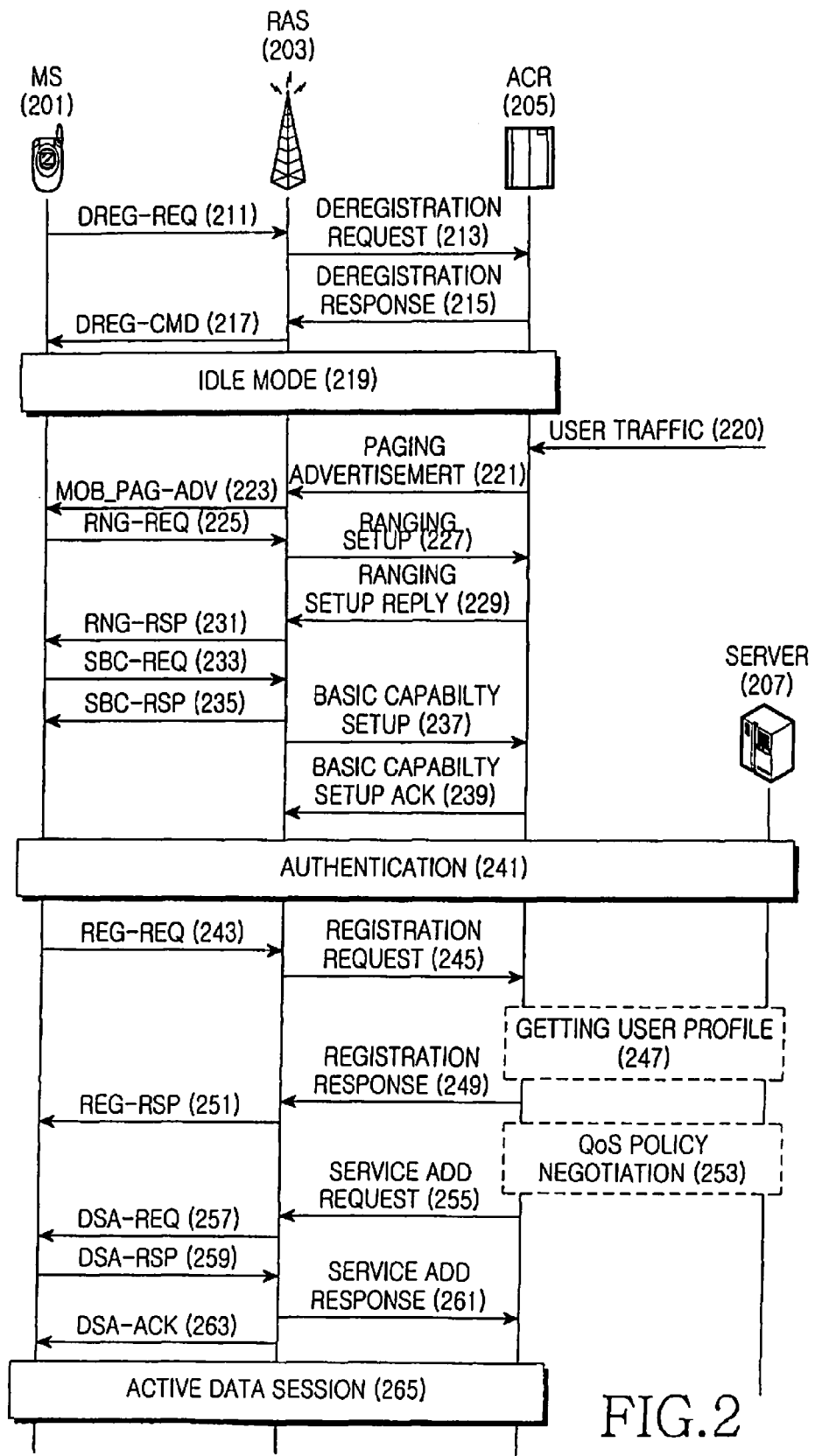
FIG. 2 is a signaling diagram illustrating a transmission/reception flow of a paging signal in a communication system according to the first embodiment of the present invention.

The ACR 107 performs a function of controlling the RAS 103, and the one ACR 107 can control multiple RASs. In addition, the ACR 107 transmits communication services provided by the servers 111, 113, 115 and 117 to the RAS 103 to provide the communication services to the MS 101 accessing the communication system, and to this end, performs authentication for the MS 101, MAC protocol processing, IP address allocation, routing, etc. More specifically, the ACR 107 performs a function in a MAC layer, which is an upper layer of the MAC layer where the RAS 103 performs the function, controls handoff between RASs and also controls the idle mode and active mode between MS 101 and the RAS 103, and performs authentication and accounting for the MS 101, and a proxy function necessary for account management. The IP networks 105 and 109 process interfacing with the RAS 103, the ACR 107, and the servers for providing communication services, i.e. the VoD/AoD server 111, the web server 113, the VoIP/VT server 115, and the messenger server 117, thereby forming a network. With reference to FIG. 2, a detailed description will now be made of signal transmission/reception in a communication system according to the present invention.

FIG. 2 is a signaling diagram illustrating a transmission/reception flow of a paging signal in a communication system according to the present invention. FIG. 2 shows a schematic transmission/reception flow of a signal where while providing a communication service to a user, the communication system, after transitioning from the active mode to the idle mode due to absence of data to be exchanged between the MS and the RAS, transitions back to the active mode as it has a service to provide to the user in the idle mode.

Referring to FIG. 2, if, as assumed above, an MS 201 has no data to be exchanged with a RAS 203 in the active mode, the MS 201 sends a De-Registration Request (DREG-REQ) message to the RAS 203 to transition from the active mode to the idle mode in step 211. Then the RAS 203 sends a De-Registration Request to an ACR 205 in response to the received DREG-REQ message in step 213. In response to the Request, the ACR 205 sends a De-Registration Response so that the RAS 203 and the MS 201 transition from the active mode to the idle mode in step 215. Thereafter, the RAS 203 sends a De-Registration Command (DREG-CMD) message to the MS 201 in response to the Response from the ACR 205 in step 217. Then the MS 201, the RAS 203 and the ACR 205 operate in the idle mode in step 219.

If the ACR 205 has, as user traffic, a communication service to provide to the MS 201, i.e. has data to transmit to the MS 201 from an arbitrary server among the servers for providing communication services, described in FIG. 1 in step 220, the ACR 205 includes, in a Paging Advertisement, service information corresponding to a service type of the transmission data, i.e. a service type of the data to be transmitted by the arbitrary server that desires to provide a particular communication service to the MS 201, and instructs the RAS 203 to send the Paging Advertisement to the MS 201 in step 221. Then the RAS 203 broadcasts, to the MS 201, a MOB_PAG-ADV message including service information corresponding to the service type of the data to be transmitted to the MS 201 in step 223. As described above, in the communication system according to the present invention, the MOB_PAG-ADV message including service information corresponding to a service type of the data to be transmitted to the MS 201, i.e. the MOB_PAG-ADV message according to the present invention, includes service information corresponding to the service type of the data to be transmitted to the MS 201, in a TLV (Type, Length, Value) Encoded Information field or a Reserved field of the MOB_PAG-ADV message shown in Table 1 below. Table 1 shows a format of a MOB_PAG-ADV message, a description of each field of which will be omitted herein.

TABLE 1

| Syntax | Size (bits) | Notes |
| --- | --- | --- |
| MOB_PAG-ADV_Message_format( ) { | — | — |
|    Management Message Type = 62 | 8 | — |
|    Num_Paging_Group_IDs | 8 | Number of Paging Group IDs in this message |
|    For (i=0; i<Num_Paging_Group_IDs; i++) { | — | — |
|      Paging Group ID | 8 | — |
|    } | — | — |
|    Num_MACs | 8 | Number of MS MAC addresses |
|    For (i=0; j<Num_MACs; j++) { | — | — |
|      MS MAC Address hash | 24 | The hash is obtained by computing a CRC24 on the MS 48-bit MAC address. The polynomial for the calculation is 0x1864CFB. |
|      Action Code | 2 | Paging action instruction to MS 0b00 = No Action Required 0b01 = Perform Ranging to establish location and acknowledge message 0b10 = Enter Network 0b11 = reserved |
|      Reserved | 6 | |
|    } | | |
|    padding | variable | Padding bits to ensure octet aligned |
|    TLV Encoded Information | variable | TLV specific |
| } | — | — |

Upon receipt of the MOB_PAG-ADV message including the service information corresponding to the service type of the data to be transmitted to the MS 201 from the RAS 203, the MS 201 activates an application program corresponding to the service type of the transmission data, and then sends a Ranging-Request (RNG-REQ) message to the RAS 203 in step 225. In this case, the MS 201 recognizes a service type of the data to be transmitted, i.e. a type of the communication service to be provided from the servers described in FIG. 1, upon its transition from the idle mode to the active mode, by receiving the MOB_PAG-ADV message including the service information corresponding to the service type of the data to be transmitted to the MS 201 in the idle mode. As a result, the MS 201, when it makes transition to the active mode, previously activates, to the active state, only the application program corresponding to the recognized service type among the application programs of all communication service types supportable by the MS 201 to receive data from the RAS 203.

Thereafter, the RAS 203 sends a Ranging Setup to the ACR 205 in response to the received RNG-REQ message in step 227, and the ACR 205 sends a Ranging Setup Reply to the RAS 203 in step 229. Then the RAS 203 sends a Ranging-Response (RNG-RSP) message, or a response message to the RNG-REQ message, to the MS 201 in step 231. Upon receipt of the RNG-RSP message, the MS 201 sends a Subscriber Station's Basic Capability Negotiation Request (SBC-REQ) message to the RAS 203 in step 233. The SBC-REQ message herein is a MAC message that the MS 201 sends for negotiation on its basic capability with the RAS 203, and the SBC-REQ message can include information on a modulation and coding scheme supportable by the MS 201.

The RAS 203 detects a modulation and coding scheme supportable by the MS 201, included in the SBC-REQ message received from the MS 201, and then sends a Subscriber Station's Basic Capability Negotiation Response (SBC-RSP) message, or a response message to the SBC-REQ message, to the MS 201 in step 235. In addition, the RAS 203 sends a Basic Capability Setup of the MS 201 to the ACR 205 in step 237, and the ACR 205 sends a Basic Capability Setup Acknowledgment (ACK) to the RAS 203 in step 239. As the MS 201 receives the SBC-RSP message from the RAS 203 in this manner, the MS 201 completes its basic capability negotiation, completing authentication with an authentication server 207 in step 241.

Thereafter, the MS 201 sends a Registration Request (REG-REQ) message to the RAS 203 in step 243. The REG-REQ message herein includes MS registration information of the MS 201. Upon receipt of the REG-REQ message, the RAS 203 detects MS registration information included in the REG-REQ message, and sends a Registration Request for the MS 201 to the ACR 205 in step 245. Then the ACR 205 acquires a user profile, i.e. a profile of the MS 201, from the authentication server 207 in step 247, and then sends a Registration Response to the RAS 203 in response to the Registration Request in step 249). Thereafter, the RAS 203 registers the MS 201 therein, and sends a Registration Response (REG-RSP) message, or a response message to the REG-REQ message, to the MS 201 in step 251.

Next, the ACR 205 and the authentication server 207 perform QoS Policy Negotiation on the data to be transmitted to the MS 201 in step 253, and then the ACR 205 sends a Service Add Request to the RAS 203 in step 255. Then the RAS 203 sends a Dynamic Service Addition Request (DSA-REQ) message to the MS 201 in step 257. Upon receipt of the DSA-REQ message from the RAS 203, the MS 201 sends a Dynamic Service Addition Response (DSA-RSP) message, or a response message to the DSA-REQ message, to the RAS 203 in step 259.

Figure 3:
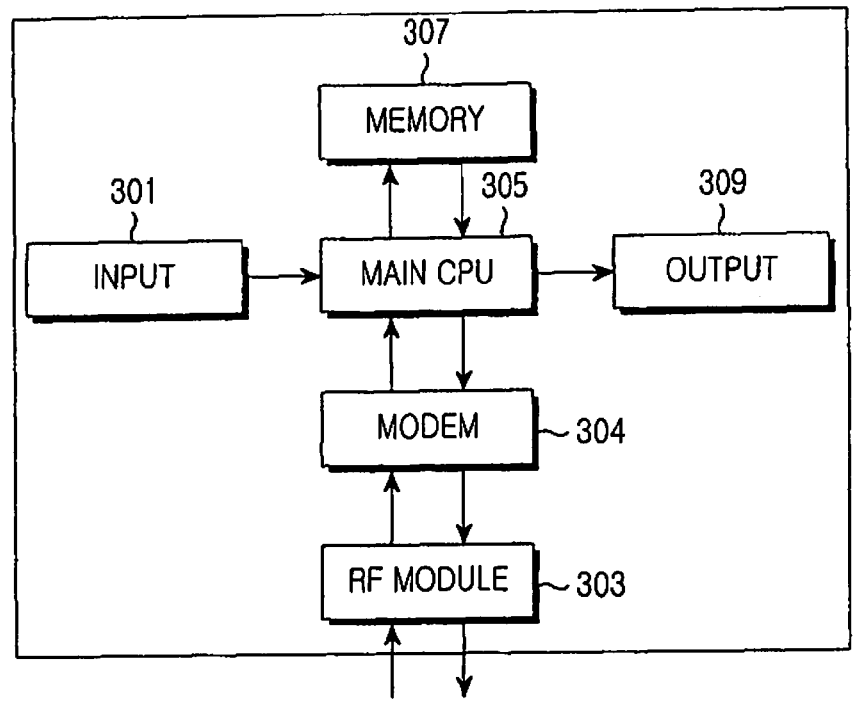
FIG. 3 is a block diagram of an MS in a communication system according to the first embodiment of the present invention.

Then the RAS 203 sends a Service Add Response to the ACR 205 in response to the Service Add Request in step 261, and sends a Dynamic Service Addition Acknowledgment (DSA-ACK) message to the MS 201 in step 263. Through use of theses procedures, an active data session is kept between the MS 201 and the communication system, i.e. between the MS 201, and the RAS 203 and ACR 205 in step 265. In this case, the MS 201 transmits/receives data through use of the application program that the MS 201 has previously activated according to the MOB_PAG-ADV message including the service information corresponding to the service type of the data to be transmitted in step 225. With reference to FIG. 3, a description will now be made of a second example of an MS in a communication system according to the present invention.

FIG. 3 shows a first example of an MS in a communication system according to the present invention.

Figure 4:
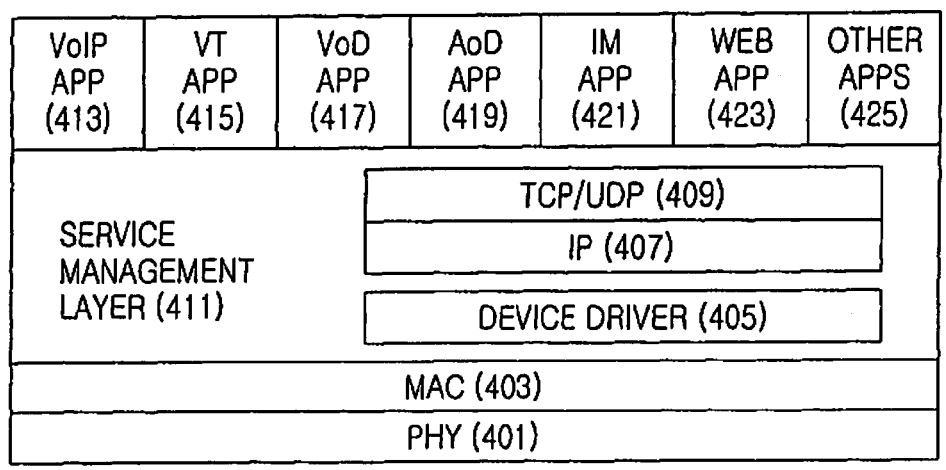
FIG. 4 is a block diagram of an MS for performing control in a communication system according to the first embodiment of the present invention.
Figure 5:
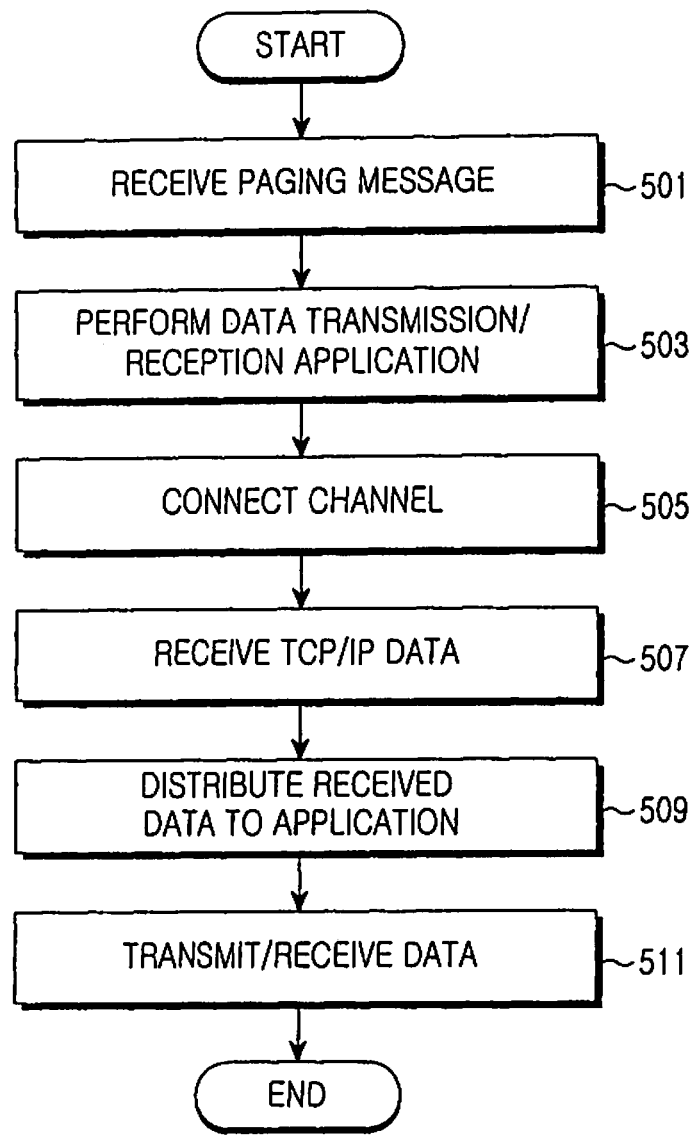
FIG. 5 is a flowchart illustrating an operation of an MS in a communication system according to the present invention.

In FIG. 3, the MS includes an input unit 301 for receiving input information from a user, an RF module 303 for processing data exchanged with a RAS, a CPU 305 for processing all operations of the MS, a modem 304 for processing data exchanged with the RF module 303, a memory 307 for storing information of the MS, and an output unit 309 for providing the transmission/reception data of the MS and the processing results to the user. With reference to FIGS. 4 and 5, a description will now be made of operation of the MS of FIG. 3, related to the present invention.

FIG. 4 shows modules for the MS of FIG. 3 for performing control in a communication system according to the present invention.

As shown in FIG. 4, the MS includes a PHY module 401 for processing an MS operation in a PHY layer, a MAC module 403 for processing an MS operation in a MAC layer, a device driver 405 for processing operations of all elements of the MS, an IP module 407 for processing an IP connection of the MS, a Transmission Control Protocol (TCP)/User Datagram Protocol (UDP) module 409 for processing a data transmission/reception operation of the MS, a service management module 411 for controlling application programs of the MS according to a service type of the data transmitted/received by the MS, and application programs for processing the data according to a communication service type supportable by the MS, e.g. a service type of the data that the MS exchanges with a RAS, to allow the MS to exchange the data with the RAS. For example, the application programs can include a VoIP application program 413 for processing data of a voice service type, a VT application program 415 for processing data of an image service type, a VoD application program 417 for processing data of a video service type, an AoD application program 419 for processing data of an audio service type, an IM application program 421 for processing data of an IM service type, a web application program 423 for processing data of an Internet web service type, and other application programs 425 for processing data of other service types.

Upon receipt of a MOB_PAG-ADV message including service information corresponding to a service type of the data to be transmitted to the MS itself from the RAS in the idle mode, the MS activates only the application program corresponding to the service information included in the received MOB_PAG-ADV message, e.g. corresponding to the service type of the data to be transmitted to the MS itself. Thereafter, upon receipt of data of a particular service type from the RAS, the MS receives a communication service by processing the data through use of the application program already activated after receiving the MOB_PAG-ADV message, e.g. through use of the application program corresponding to the service type of the received data.

For example, when data to be transmitted to the MS is data of an IM service type, the MOB_PAG-ADV message includes service information indicating that a service type of the data to be transmitted to the MS is an IM service, and upon receipt of the MOB_PAG-ADV message including the IM service information, the MS activates only the IM application program 421 among the application programs described above. Thereafter, when an active data session between the MS and the communication system is kept as described in FIG. 2, the MS exchanges data of the IM service type with the communication system, e.g. receives the IM service. With reference to FIG. 5, a description will now be made of an operation of the MS of FIG. 3 in a communication system according to the present invention.

FIG. 5 shows an operation of an MS in a communication system according to the present invention.

In FIG. 5, in step 501, the MS receives from an RAS a MOB_PAG-ADV message including information on a communication service that the MS will receive from a communication system, e.g. including service information corresponding to a service type of the data to be transmitted to the MS itself. Thereafter, in step 503, the MS recognizes a type of the communication service, received through the service information included in the MOB_PAG-ADV message, e.g. the service type of the data to be transmitted to the MS itself, and activates an application program corresponding to the recognized service type of the data to exchange the data with the RAS. Thereafter, in step 505, the MS shares resource corresponding to the recognized service type of the data, i.e. connects a channel to the RAS, to receive the data to be transmitted from the RAS.

If a channel is connected to the RAS in step 505, the MS receives the data from the RAS over TCP/IP in step 507. In step 509, the MS distributes the received data to the application corresponding to the service type, e.g. allows the application program previously activated in step 503 to process the received data. Thereafter, in step 511, the MS exchanges data with the RAS through use of the application program, thereby receiving the communication service.

As described above, in the communication system according to the present invention, if the RAS has a communication service to provide to the MS, i.e. has data of a particular service type to transmit to the MS, it sends to the MS a MOB_PAG-ADV message including service information corresponding to the service type of the transmission data, and upon receipt of the MOB_PAG-ADV message, the MS activates only the application program of the service type corresponding to the service information, i.e. activates only the application program corresponding to the service type of the data that the RAS will transmit, thereby preventing unnecessary waste of power and memory of the communication system, especially the MS. In addition, because the MS receives a MOB_PAG-ADV message and recognizes a service type of the data to be transmitted by the RAS depending on the received MOB_PAG-ADV message, the MS can share only the resource corresponding to the transmission data, thereby preventing waste of the resource. When the communication system provides a communication service to the user, in other words, when there is data exchange between the RAS and the MS, the MS previously activates an application program corresponding to the data to be exchanged, thereby preventing power waste and thus facilitating fast reception of the communication service. Before a description of power control for controlling power of modules in the MS is given, a second example of an MS for controlling power in a communication system according to the present invention will now be described with reference to FIGS. 6A and 6B.

Figure 6A:
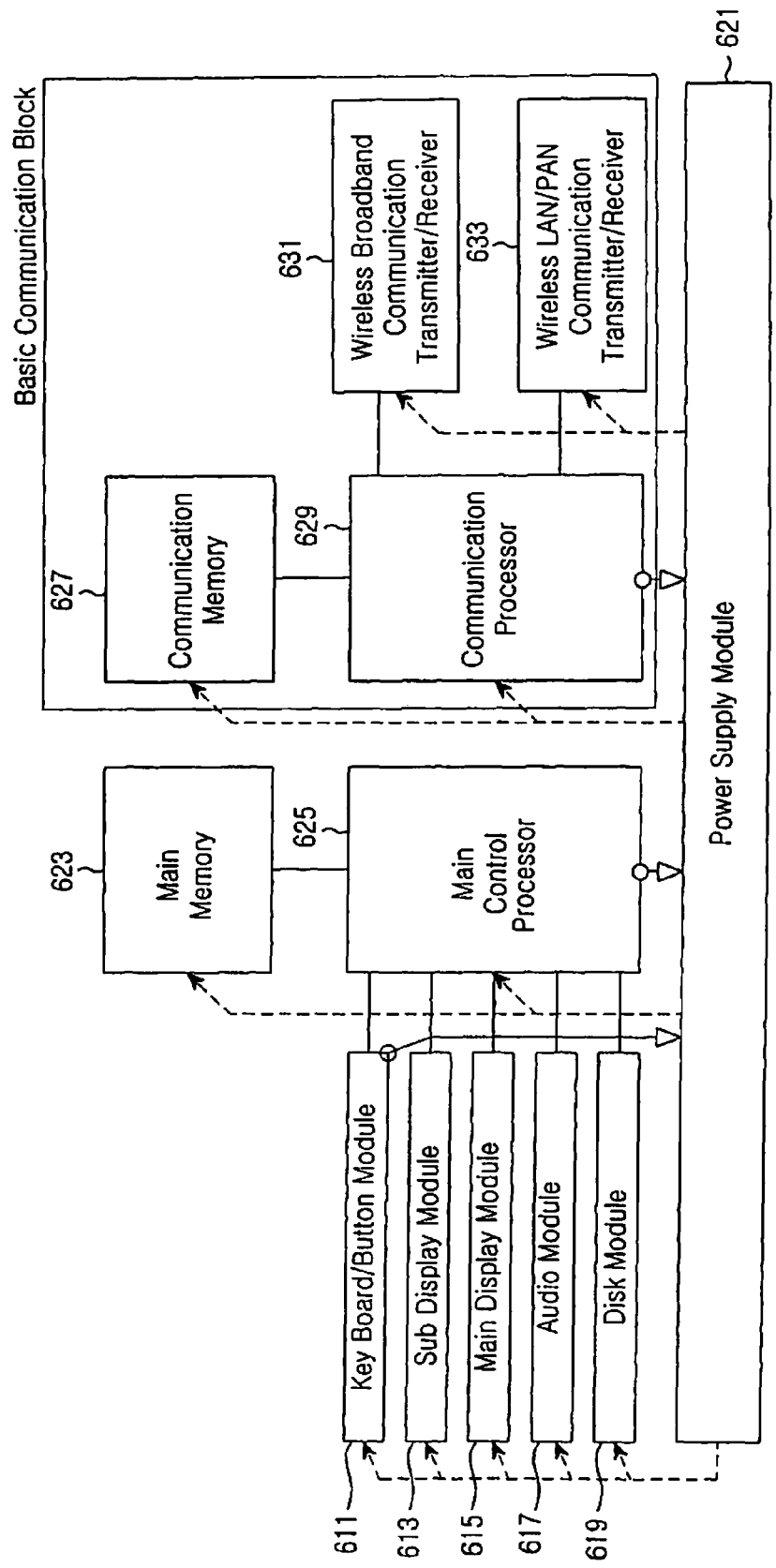
FIGS. 6A and 6B are block diagrams of an MS for performing power control in a communication system according to second and third embodiments of the present invention.
Figure 6B:
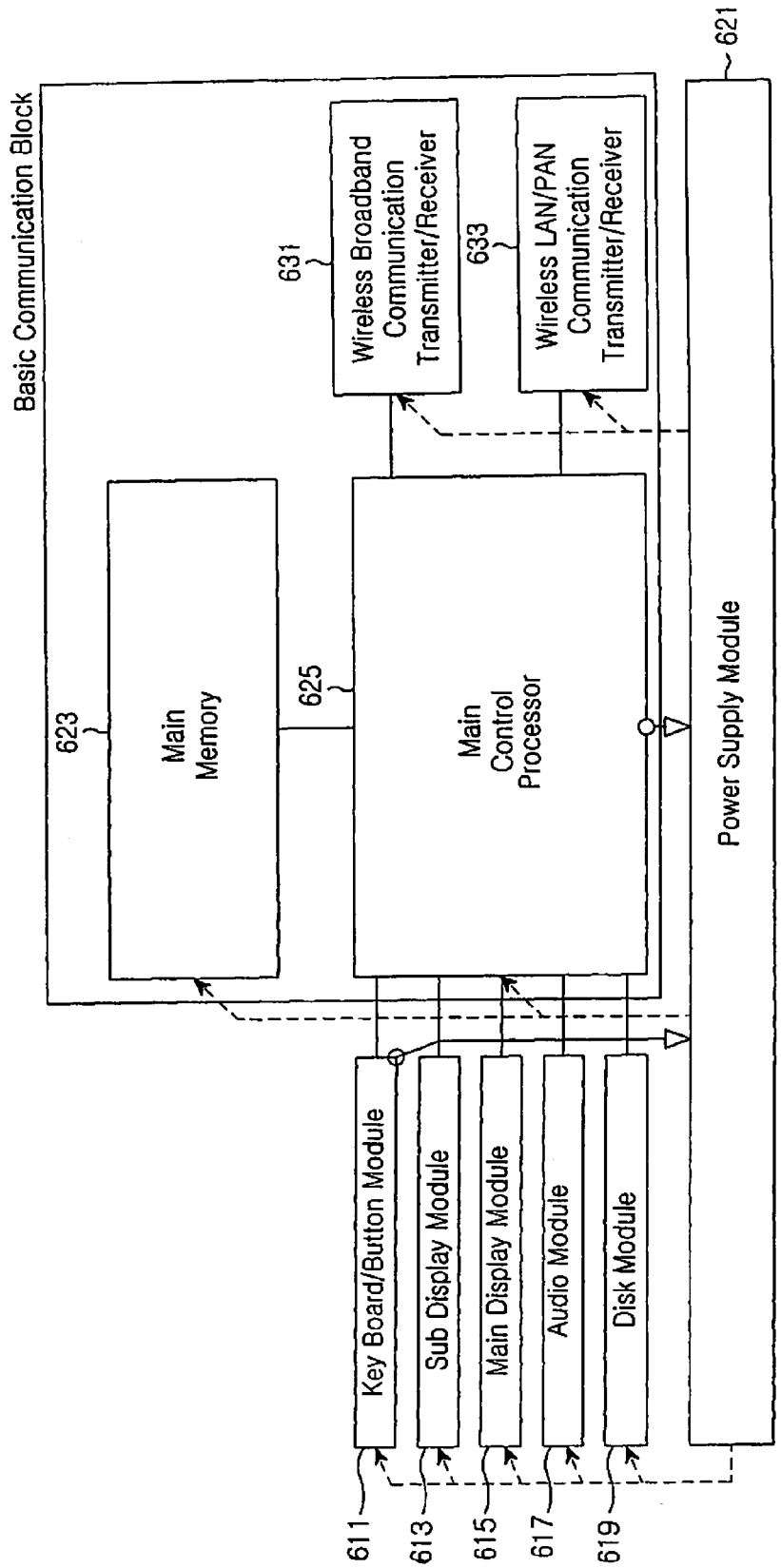

FIGS. 6A and 6B shows second and third examples of an MS for performing power control in a communication system according to the present invention.

In FIG. 6A, the MS includes an input module in the form of a key board/button module 611 for receiving user input information from a user through use of a key board/button, a sub-display module 613 for displaying a received message or a received service request for the user, a main display module 615 for displaying functions provided by the MS for the user, an audio module 617 for processing an audio signal, a disk module 619 for storing information, and a power supply module 621 for supplying power to the modules of the MS. The MS of FIG. 6A also includes a main memory 623, used as a main memory of the MS, for storing information based on an operation of the MS, a main controller in the form of a main control processor 625 for controlling operations of all modules in the MS, a communication memory 627 for storing information based on a communication service through use of a communication module of the MS, a communication controller in the form of communication processor 629 for controlling communication modules, a wireless broadband communication transmitter/receiver 631 for performing data exchange with the RAS, and a wireless Local Area Network and Personal Area Network (LAN/PAN) communication transmitter/receiver 633 for performing data exchange with an MS-assistant device that interacts with the MS and can perform simple data communication such as voice, for example, performing data exchange via Wireless Local Area Network (WLAN), Personal Area Network (PAN), Bluetooth, etc.

As for separate basic communication modules for performing separate communication operations, a basic communication block includes the communication memory 627, the communication processor 629, the first transmitter/receiver 631 and the second transmitter/receiver 633.

The MS includes a separate external MS-assistant device interacting with the MS, for example, includes a headset, a small communication MS, etc. Therefore, the second transmitter/receiver 633 is used for communication with the external MS-assistant device. The second transmitter/receiver 633 can be disposed in either inside or outside of the communication block.

In addition, the second transmitter/receiver 633 can selectively be included in the MS according to use/non-use of the external MS-assistant device.

FIG. 6A shows where a communication-only processor for communication and a communication-only memory are separately provided. In this case, the main control processor 625 can receive the communication service only with the operation of the communication processor 629 in a Power-Off State when the main controller 625 performs in a communication operation.

FIG. 6B shows where the separate communication modules, for example, the communication memory 627 and the communication processor 629, are not provided.

The MS shown in FIG. 6B includes an input module 611 for receiving user input information from the user through use of a key board/button, a sub-display module 613 for displaying a received message or a received service request for the user, a main display module 615 for displaying functions provided by the MS for the user, an audio module 617 for processing audio signal, a disk module 619 for storing information, a power supply module 621 for supplying power to the modules of the MS. The MS shown in FIG. 6B also includes a main memory 623, used as a main memory of the MS, for storing information based on an operation of the MS, a main controller 625 for controlling operations of all modules in the MS, a wireless broadband communication transmitter/receiver 631 for performing data exchange with the RAS, and a wireless LAN/PAN communication transmitter/receiver 633 for performing data exchange with an MS-assistant device that interacts with the MS and can perform simple data communication such as voice, for example, performing data exchange via WLAM, PAN, Bluetooth, etc.

In FIG. 6B, operations of the communication memory 627 and the communication processor 629 of FIG. 6A are performed by the main memory 623 and the main control processor 625, respectively. Therefore, in the MS shown in FIG. 6B, the communication block includes the main memory 623, the main processor 625, the first transmitter/receiver 631, and the second (or LAN/PAN) transmitter/receiver 633.

A description of the operations of the modules shown in FIGS. 6A and 6B will be omitted herein for simplicity.

Figure 7:
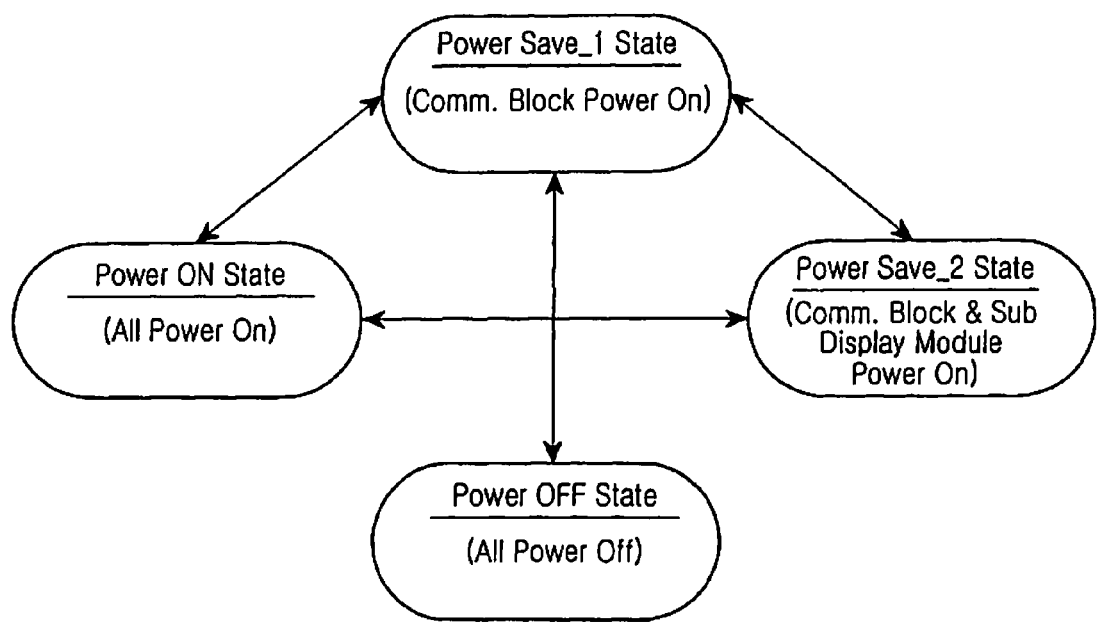
FIG. 7 is a diagram illustrating a state transition diagram based on a power state of an MS in a communication system according to the present invention.

In the MS's shown in FIGS. 6A and 6B, solid lines between the modules are paths via which signal information and data are transmitted, and dotted lines between the modules are paths via which power is supplied to the modules. Some modules of the MS, for example, the input module, the main controller and the communication controller, can control the power supply module 621. With reference to FIG. 7, a description will now be made of state transition based on a power state of the MS, provided by the present invention.

FIG. 7 shows a state transition diagram based on a power state of an MS in a communication system according to the present invention.

Referring to FIG. 7, the MS according to the present invention includes, for example, a Power-On State, a Power-Off State, a Power Save_1 State, and a Power Save_2 State.

Basically, the MS is in the Power-Off State, when no power is supplied thereto. In the state where no power is supplied to all elements in the MS, the MS performs no operation.

The MS enters the Power-On State upon receipt of a Power-On request from the user through use of a power button and the like. In this state, power is supplied to all elements in the MS, maximizing the power consumption of the MS.

The present invention provides the Power Save_1 State and the Power Save_2 State, by way of example. In the Power Save_1 State and the Power Save_2 State, power is supplied only to some of the modules in the MS, and power supply to other modules except for the power-supplied modules is interrupted. The MS can enter the Power Save_1 State and the Power Save_2 State, if its user does not use the MS for a time or makes a request for state transition through use of an input module.

The Power Save_1 State interrupts the power supply to all modules in the MS except for, for example, the basic communication block. Therefore, in the Power Save_1 State, the MS, though it can communicate with the RAS, does not enable additional functions performed using the non-power-supplied modules. Meanwhile, the Power Save_1 State can be classified into a Power Save_1_Active State where all the communication blocks normally operate in the active state, and a Power Save_1_Idle State where the communication blocks operate in the idle state, and these states correspond to the active mode and the idle mode of the general MS, respectively.

The Power Save_2 State interrupts the power supply to all modules in the MS except for, for example, the basic communication block and the sub-display module. Therefore, in the Power Save_2 State, the MS can communicate with the RAS and can display a received message and/or the contents received at a service request through use of the sub-display module. However, the MS does not enable the additional functions performed using the non-power-supplied modules except for the communication block and the sub-display module. Similarly, the Power Save_2 State can be classified into a Power Save_2_Active State where all the communication blocks normally operate in the active state, and a Power Save_2_Idle State where the communication blocks operate in the idle state, and these states correspond to the active mode and the idle mode of the general MS, respectively. In the Power Save_2 State, when the sub-display module is not supported or use of the main display module is possible, the MS can enable the main display module rather than the sub-display module.

Figure 8A:
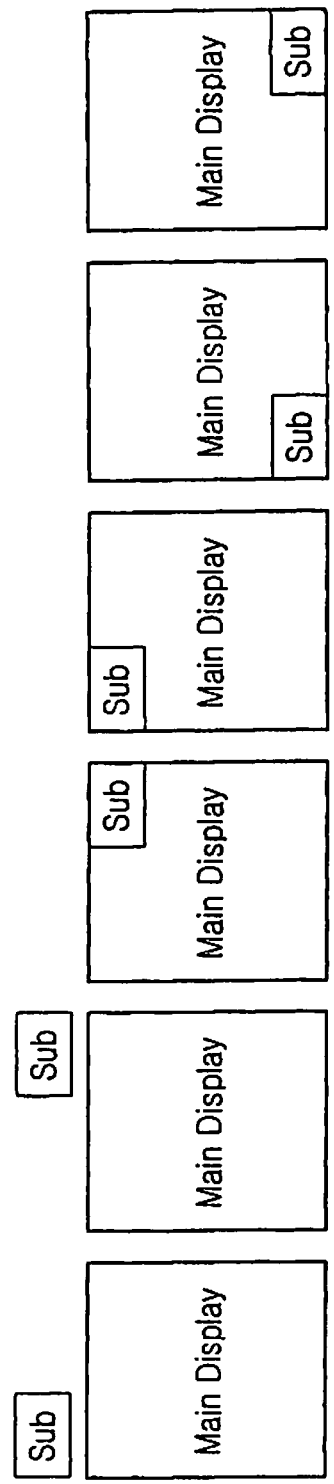
FIGS. 8A and 8B are diagrams illustrating an implemented sub-display module of an MS according to the present invention.
Figure 8B:
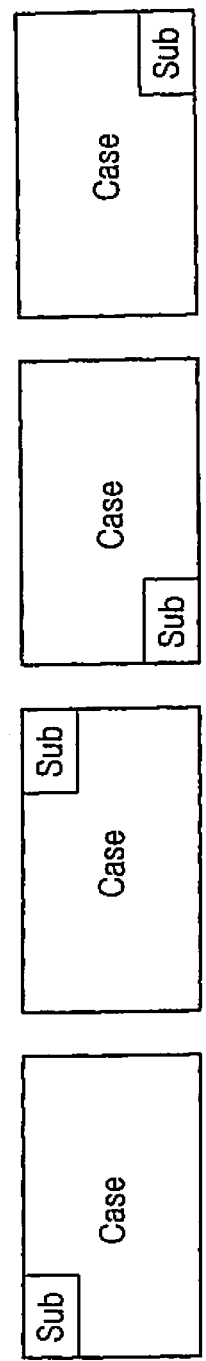

In FIG. 7, state transition between the individual states is possible depending on the MS's operation state and/or the MS user's request. With reference to FIGS. 8A and 8B, a description will now be made of implementation of the sub-display module.

FIGS. 8A and 8B show an implemented sub-display module of an MS according to the present invention.

Referring to FIG. 8A, there are shown a variety of main displays of MSs, for example, a Personal Digital Assistants (PDA), a Tablet PC, etc., and sub-display modules can be included inside or outside of the main display modules.

Referring to FIG. 8B, there are shown various external cases of, for example, a Personal Computer (PC) such as laptop, a notebook PC, a Portable Multimedia Player (PMP), a Ultra Mobile PC (UMPC), etc., and similarly, the sub-display modules can be implemented inside or outside of the main display modules.

Figure 9:
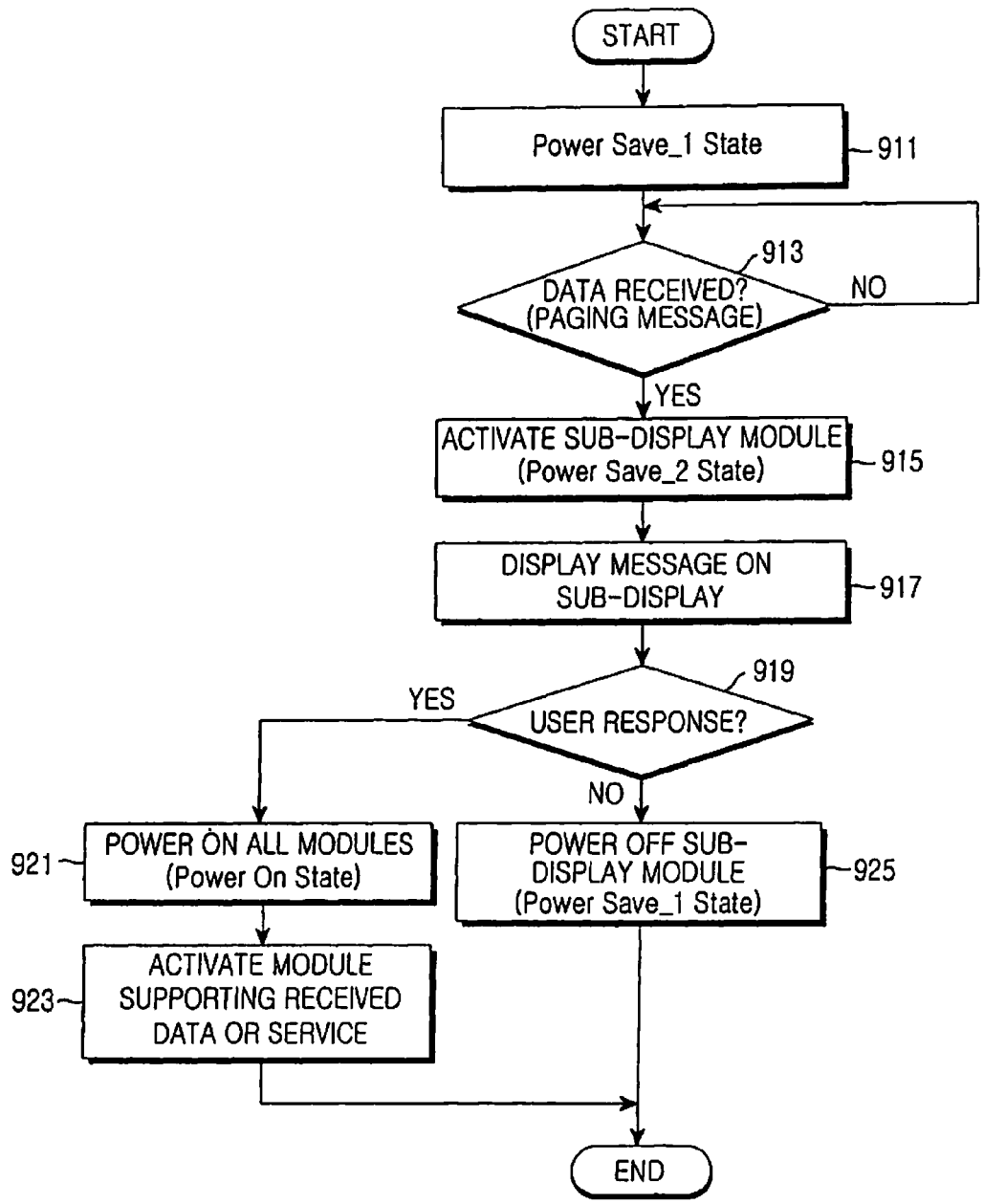
FIG. 9 is a flowchart illustrating a first example of a power control operation of an MS according to the present invention.

In the Power-On State of FIG. 7, the MS can transition to the Power-Off State, the Power Save_1 State and the Power Save_2 State depending on the MS's state and/or the user input of the MS. In the Power-On State, the MS does not need to power ON all modules in the MS in performing data communication and respective functions in the MS. With reference to FIGS. 7 and 9, a description will now be made of an operation of an MS according to the present invention in the Power Save_1 State.

FIG. 9 shows an example of a power control operation of an MS according to the present invention.

Referring to FIG. 9, in step 911, the MS operates in a Power Save_1 State. In the Power Save_1 State, an MS, as described above, enables only the modules in the communication block, and supplies power only to the modules included in the communication block.

In step 913, the MS determines whether the MS has received data. The MS can receive the data, by receiving from a RAS a paging message, for example, a MOB_PAG-ADV message, recognizing a service type of received data depending on the MOB_PAG-ADV message, and previously activating to the active state only the application program corresponding to the recognized service type, as described above. When it is determined in step 913 that the MS has received no data, the MS waits for data.

However, when it is determined in step 913 that the MS has received data, the MS proceeds to step 915 where the MS enables a sub-display module by supplying power to the sub-display module, and then proceeds to step 917. When the MS supplies power to the sub-display module, the MS enters a Power Save_2 State.

In step 917, the MS displays a message corresponding to the received data on the sub-display module, and then proceeds to step 919. The MS displays all or a part of a text message corresponding to the received data through use of the sub-display module. In addition, if the received data is service request-related data, the MS displays a service request message corresponding to the data through use of the sub-display module.

In step 919, the MS determines whether an input from the user, e.g. user input information, is detected.

If it is determined in step 919 that no user input information is detected within a certain time, the MS proceeds to step 925 where the MS powers OFF the sub-display module. After powering off the sub-display module, the MS operates in the Power Save_1 State. Alternatively, the MS can operate in the Power Save_2 State where the sub-display module and the communication block are enabled, instead of performing step 925.

However, when it is determined in step 919 that user input information is detected, the MS proceeds to step 921 where it powers ON the remaining modules except for the communication module and the sub-display module in the MS, and then proceeds to step 923. In step 921, the MS enters a Power-On State.

Figure 10:
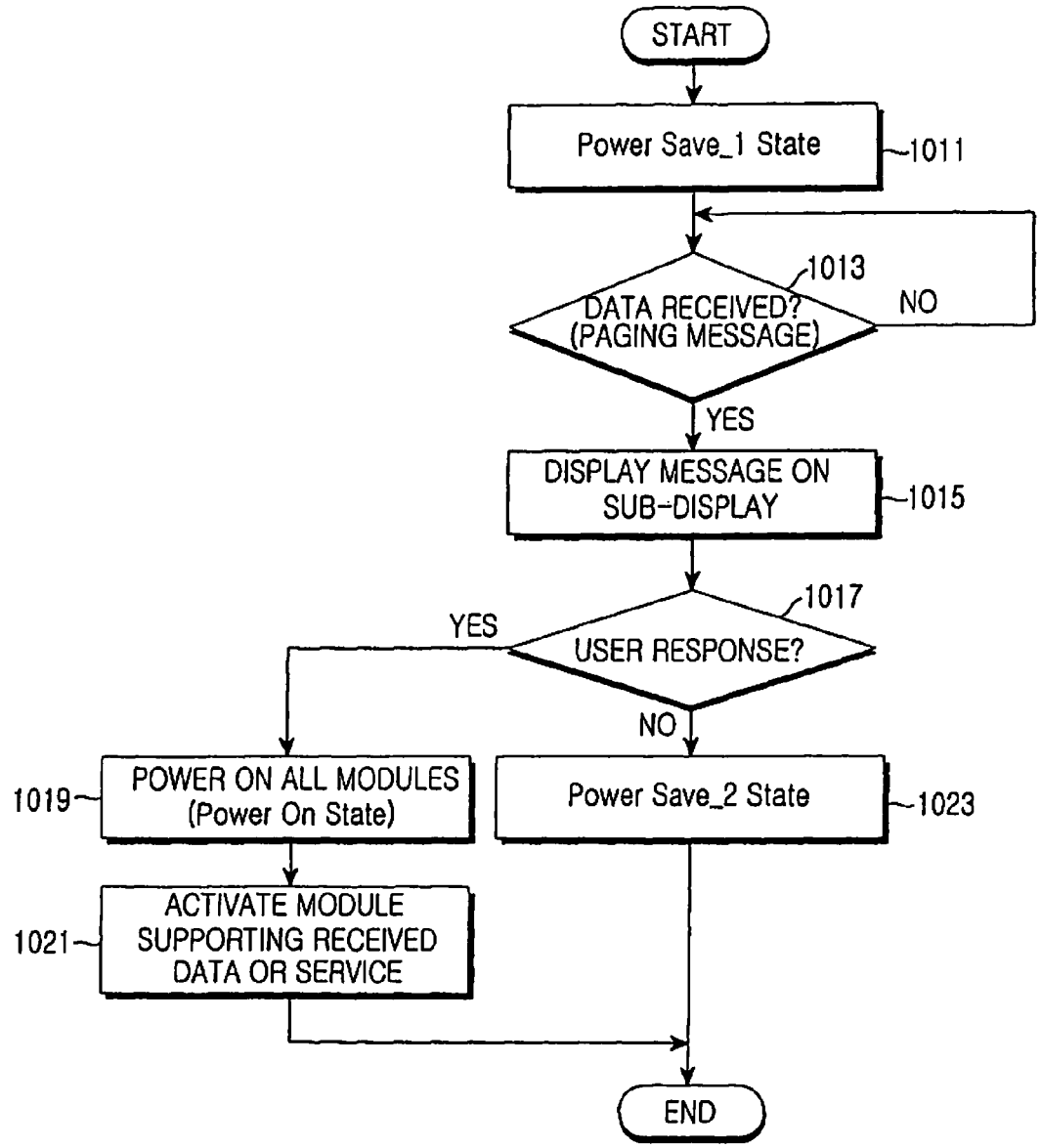
FIG. 10 is a flowchart illustrating a second example of a power control operation of an MS according to the present invention.

In step 923, the MS performs a communication service using the received data, or activates an application program based on a received service request through use of corresponding modules. In this manner, the MS performs an operation appropriate for the application program corresponding to the received data. With reference to FIGS. 7 and 10, a description will now be made of an operation of an MS according to the present invention in the Power Save_2 State.

FIG. 10 shows another example of a power control operation of an MS according to the present invention.

Referring to FIG. 10, in step 1011, the MS operates in a Power Save_2 State. In the Power Save_2 State, the MS enables only the modules in the communication block and the sub-display module, and supplies power only to the modules in the communication block and the sub-display module.

In step 1013, the MS determines whether it has received data. The MS can receive the data, using a paging message, for example, a MOB_PAG-ADV message, as described above, and a detailed description thereof will be omitted herein for simplicity. If it is determined in step 1013 that it has received no data, the MS waits for data.

However, if it is determined in step 1013 that it has received data, the MS proceeds to step 1015 where it displays a message corresponding to the received data, and then proceeds to step 1017. The MS displays all or a part of a text message corresponding to the received data through use of the sub-display module. In addition, when the received data is service request-related data, the MS displays a service request message corresponding to the data through use of the sub-display module.

In step 1017, the MS determines whether an input from the user, i.e. user input information, is detected.

If it is determined in step 1017 that no user input information is detected within a time, the MS ends the operation. In this case, when the MS powers OFF the sub-display module, the MS can operate in the Power Save_1 State.

However, if it is determined in step 1017 that user input information is detected, the MS proceeds to step 1019 where it powers ON the remaining modules except for the communication modules in the MS and the sub-display module, and then proceeds to step 1021. In step 1019, the MS enters the Power-On State.

In step 1021, the MS performs a communication service using the received data, or activates an application program based on a received service request through use of corresponding modules. In this manner, the MS performs an operation appropriate for the application program corresponding to the received data.

Figure 11:
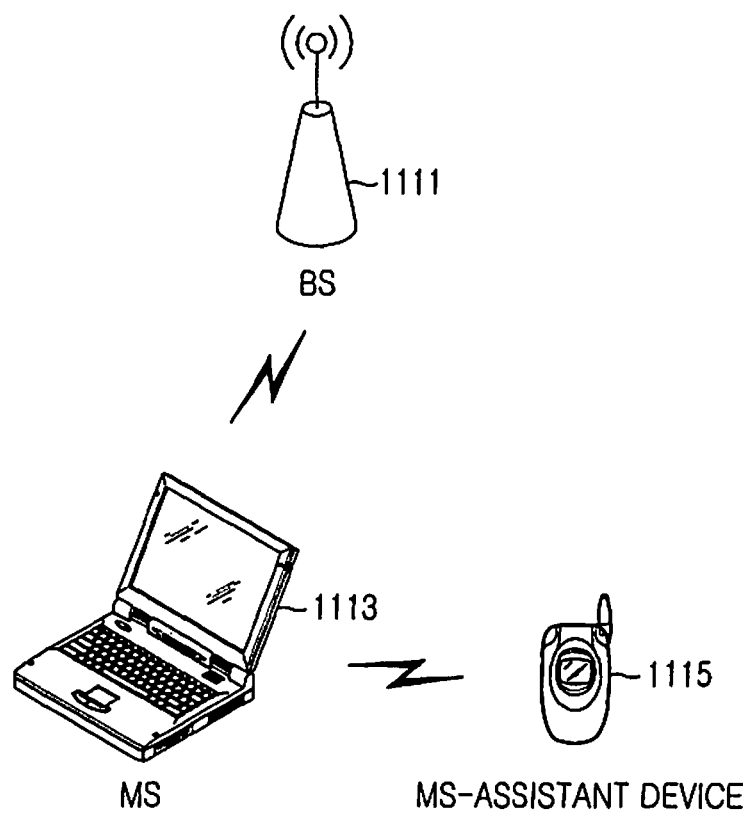
FIG. 11 is a diagram illustrating an MS with an MS-assistant device according to the present invention.

The operation of an MS, as shown in FIGS. 9 and 10, can be controlled by the main controller or the communication controller included in the communication block, as shown in FIGS. 6A and 6B. In addition, the application program means a program for driving a service available for each individual MS according to each MS's characteristic. Further, the MS, as described above, receives a paging message from the RAS, recognizes a service type of the data to be received from the RAS depending on the paging message, and previously activates to the active state only the application program corresponding to the recognized service type, thereby reducing the power consumption. With reference to FIG. 11, a description will now be made of an operation of an MS including an external MS-assistant device in a communication system according to the present invention.

FIG. 11 shows an MS with an MS-assistant device according to the present invention.

Referring to FIG. 11, an MS 1113 communicates with a RAS 1111, and transmits a signal received from the RAS 1111 to an MS-assistant device 1115.

The MS-assistant device 1115, a separate external MS-assistant device interacting with the MS 1113, can include, for example, a headset, a small communication MS, etc. FIG. 11 shows where a user performs communication with a separate external assistant device capable of a voice call, when it is inconvenient for the user to perform the voice call through use of such device as a notebook PC.

The MS 1113 can transmit the signal received from the RAS 1111 to the MS-assistant device 1115 only with an operation of a communication block, and the communication block further includes a transmission/reception module for transmitting the signal received from the RAS 1111 to the MS-assistant device 1115.

Figure 12:
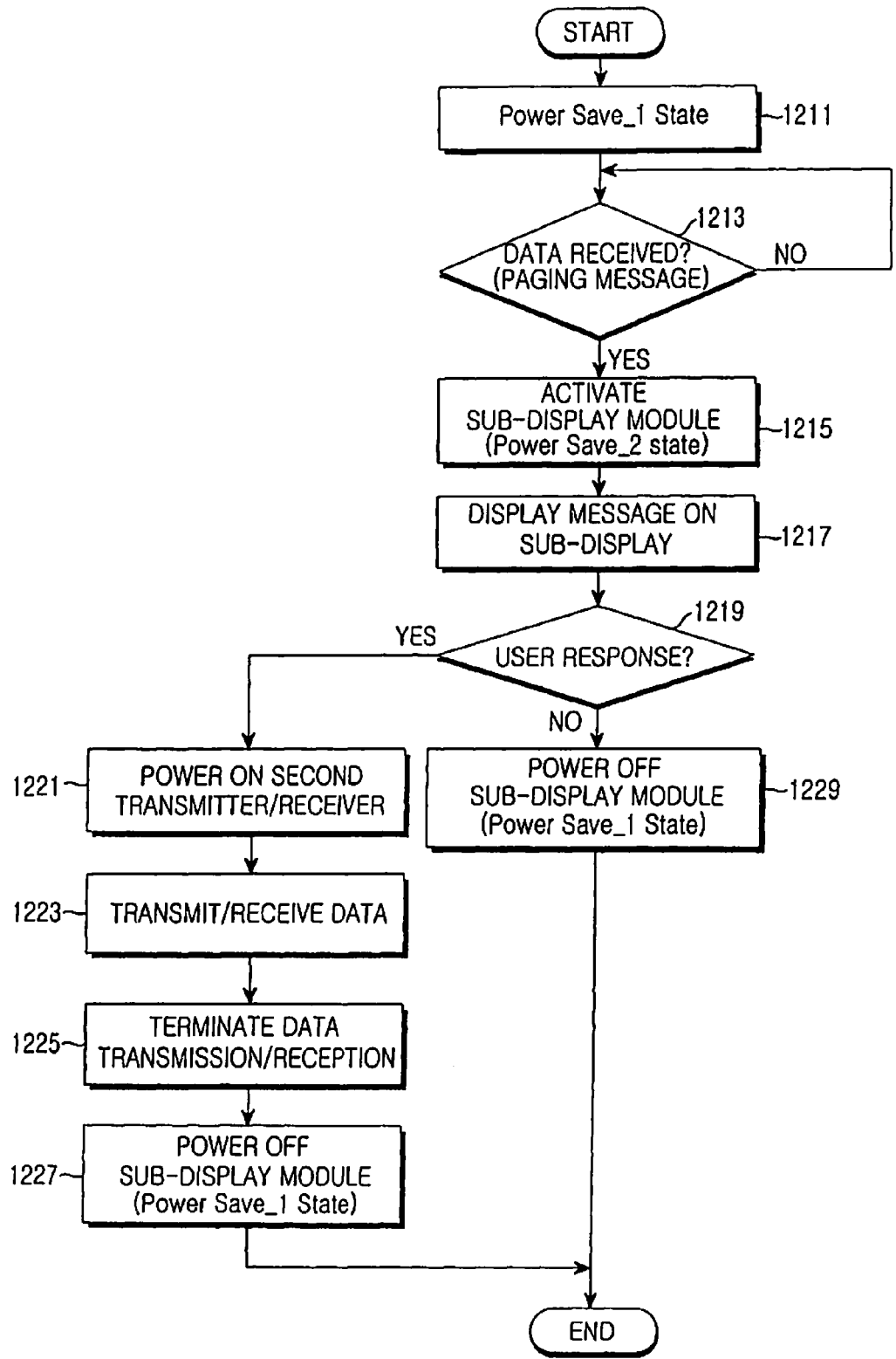
FIG. 12 is a flowchart illustrating a third example of a power control operation of an MS with an MS-assistant device according to the present invention.

With reference to FIGS. 7 and 12, a description will now be made of an operation of an MS according to the present invention that performs communication using the MS-assistant device in the Power Save_1 State.

FIG. 12 shows a power control operation of an MS with an MS-assistant device according to the present invention.

In FIG. 12, in step 1211, the MS operates in a Power Save_1 State. In the Power Save_1 State, the MS enables only the modules in a communication block, and supplies power only to the modules included in the communication block. In addition, a second transmitter/receiver in the communication module can be either powered ON or powered OFF.

In step 1213, the MS determines whether the MS has received data. The MS can receive the data using, for example, a paging message. When it is determined in step 1213 that the MS has received no data, the MS returns to step 1213 and waits for data.

However, if it is determined in step 1213 that the MS has received data, the MS proceeds to step 1215 where it enables a sub-display module by supplying power to the sub-display module, and then proceeds to step 1217. After supplying power to the sub-display module, the MS enters a Power Save_2 State.

In step 1217, the MS displays a message corresponding to the received data, and then proceeds to step 1219. The received data can be voice data, and the MS displays the receipt of the data on the sub-display module.

In step 1219, the MS determines whether an input from the user, e.g. user input information, is detected.

If it is determined in step 1219 that no user input information is detected within a time, the MS proceeds to step 1229 where it powers OFF the sub-display module and then ends the operation. After powering OFF the sub-display module, the MS operates in the Power Save_1 State. Alternatively, the MS can operate in the Power Save_2 State where the sub-display module and the communication block are enabled, instead of performing step 1229.

However, if it is determined in step 1219 that user input information is detected, the MS proceeds to step 1221 where it powers ON the second transmitter/receiver in the MS, and then proceeds to step 1223. The second transmitter/receiver enables communication with the MS-assistant device, making it possible to provide a communication service through data exchange between the MS and the MS-assistant device.

In step 1223, the MS performs a communication service through use of the second transmitter/receiver, and then proceeds to step 1225.

In step 1225, the MS powers OFF the sub-display module and then ends the operation, after terminating the data exchange with the MS-assistant device, e.g. after closing the communication service. After powering OFF the sub-display module, the MS operates in the Power Save_1 State. Alternatively, the MS can operate in the Power Save_2 State where the sub-display module and the communication block are enabled, instead of performing step 1227.

Figure 13:
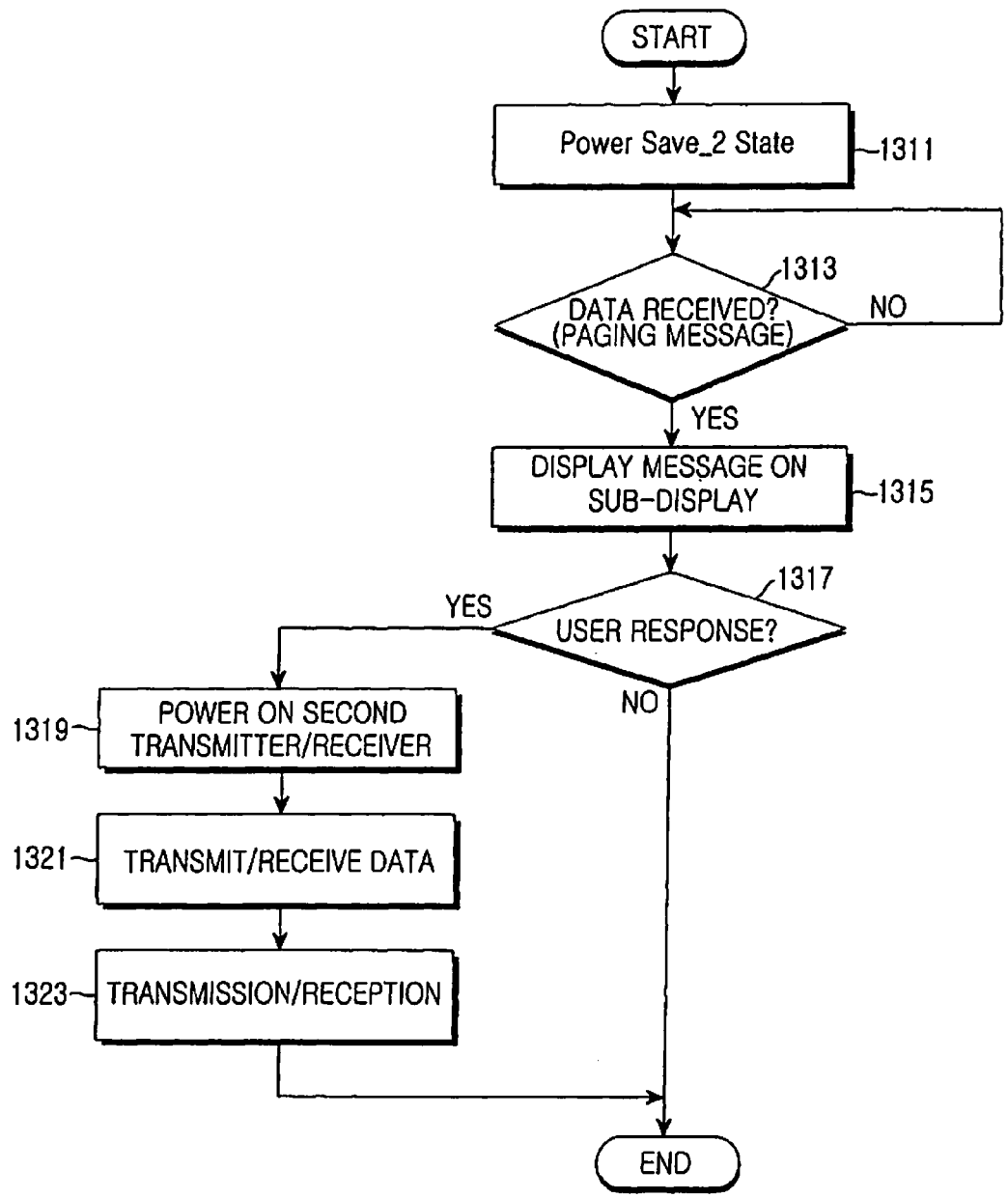
FIG. 13 is a flowchart illustrating a fourth example of a power control operation of an MS with an MS-assistant device according to the present invention.

With reference to FIGS. 7 and 13, a description will now be made of an operation of an MS according to the present invention that performs communication using the MS-assistant device in the Power Save_2 State.

FIG. 13 shows another example of a power control operation of an MS with an MS-assistant device according to the present invention.

In FIG. 13, in step 1311, the MS operates in a Power Save_2 State. In the Power Save_2 State, the MS enables only the modules in the communication block and the sub-display module, and supplies power only to the modules in the communication block and the sub-display module. In addition, a second transmitter/receiver in the communication module can be either powered ON or powered OFF.

In step 1313, the MS determines whether the MS has received data. The MS can receive the data using a paging message, for example, a MOB_PAG-ADV message, and a detailed description thereof will be omitted herein for simplicity. If it is determined in step 1313 that it has received no data, the MS waits for data.

However, if it is determined in step 1313 that it has received data, the MS proceeds to step 1315 where the MS displays a message corresponding to the received data, and then proceeds to step 1317. The received data can be voice data, and the MS displays the receipt of the data on the sub-display module.

In step 1317, the MS determines whether an input from the user, i.e. user input information, is detected.

If it is determined in step 1317 that no user input information is detected within a time, the MS ends the operation. In this case, when the MS powers OFF the sub-display module, the MS can operate in the Power Save_1 State.

However, if it is determined in step 1317 that user input information is detected, the MS proceeds to step 1319 where the MS powers ON the second transmitter/receiver in the MS, and then proceeds to step 1321. The second transmitter/receiver enables communication with the MS-assistant device, making it possible to provide a communication service through data exchange between the MS and the MS-assistant device.

In step 1321, the MS performs a communication service through use of the second transmitter/receiver, and then proceeds to step 1323.

In step 1323, the MS ends the operation after terminating the data exchange with the MS-assistant device, i.e. after closing the communication service. In this case, the MS operates in the Power Save_2 State where the sub-display module and the communication block are enabled. In addition, after closing the communication service and powering OFF the sub-display module, the MS can operate in the Power Save_1 State.

In FIGS. 12 and 13, each user may not check the sub-display module. In this case, steps 1219 and 1317 can be omitted. In this case, the MS can proceed from step 1213 to step 1221, or can proceed from step 1313 to step 1319.

Further, in FIGS. 12 and 13, the MS is generally assumed to transmit voice data, and the MS can send to the communication block a paging message including information on a set port number corresponding to traffic information used by a voice service, thereby transmitting only the voice data to the MS-assistant device.

Although the MS receives data using the paging message in FIGS. 9, 10, 12 and 13, by way of example, it generally means a first message for resuming communication connection to transmit information in the communication system, for the MS having no wireless communication connection.

As can be appreciated from the foregoing description, the present invention can send to the MS a message including information on the communication service type to be provided to the user, thereby preventing unnecessary power waste of the MS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A power control method by a mobile station (MS) in a communication system, the method comprising:
   activating, by the MS, a first communication module by supplying power only to the first communication module of a plurality of modules included in the MS;
   determining, by the MS, whether data is received while activating the first communication module;
   activating, by the MS, a second communication module of the plurality of modules by supplying power to the second communication module when the data is received; and
   performing, by the MS, data transmission/reception with an MS-assistant device interacting with the MS using the second communication module, the MS-assistant device being an external device separated from the MS;
   interrupting, by the MS, power supply to the second communication module when the data transmission/reception is completed; and
   activating, by the MS, the first communication module by supplying power only to the first communication module.

2. The power control method of claim 1, further comprising:
   determining, the MS, whether a display module of the plurality of modules is enabled, when the data is received;
   activating, by the MS, the display module by supplying power to the display module, when it is determined that the display module is not enabled;
   displaying, by the MS, a message corresponding to the received data on the display module;
   determining, by the MS, whether user input information corresponding to the message is detected by using an input module of the MS; and
   activating, by the MS, the second communication module by supplying power to the second communication module and performing, by the MS, the data transmission/reception with the MS-assistant device according to the user input information using the second communication module, when the user input information is detected.

3. The power control method of claim 2, further comprising:
   interrupting, by the MS, power supply to the display module, when the user input information is not detected.

4. The power control method of claim 2, wherein the display module includes a main display module and a sub-display module, and the message is displayed by means of at least one of the main display module and the sub-display module.

5. The power control method of claim 2, wherein the message indicates receipt of the data.

6. The power control method of claim 2, further comprising:
   interrupting, by the MS, power supply to the display module and the second communication module when the data transmission/reception with the MS-assistant device according to the user input information is completed.

7. The power control method of claim 1, wherein a service type of the data is included in a paging message, and the service type is at least one of a voice service, an image service, a video service, an audio service, and an Instant Messaging (IM) service.

8. A mobile station (MS) in a communication system, the MS comprising:
   a first communication module for performing wireless communication;
   a second communication module for communicating with an MS-assistant device interacting with the MS; and
   a control module for activating the first communication module by only supplying power to the first communication module, determining whether data is received while activating the first communication module, activating the second communication module by supplying power to the second communication module when the data is received, and performing data transmission/reception with the MS-assistant device using the second communication module, the MS-assistant device being an external device separated from the MS,
   wherein the control module interrupts power supply to the second communication module when the data transmission/reception is completed, and supplies power only to the first communication module.

9. The MS of claim 8, further comprising a display module and an input module, wherein the control module determines whether the display module is enabled when the data is received, activates the display module by supplying power to the display module when it is determined that the display module is not enabled, displays a message corresponding to the received data on the display module, determines whether user input information corresponding to the message is detected by using the input module, activates the second communication module by supplying power to the second communication module and performs the data transmission/reception with the MS-assistant device according to the user input information using the second communication module, when the user input information is detected.

10. The MS of claim 9, wherein the control module interrupts power supply to the display module, when the user input information is not detected.

11. The MS of claim 9, wherein the display module includes a main display module and a sub-display module, the message is displayed by means of at least one of the main display module and the sub-display module.

12. The MS of claim 9, wherein the message indicates receipt of the data.

13. The MS of claim 9, wherein the control module interrupts power supply to the display module and the second communication module when the data transmission/reception with the MS-assistant device according to the user input information is completed.

14. The MS of claim 8, wherein a service type of the data is included in a paging message, and the service type is at least one of a voice service, an image service, a video service, an audio service, and an Instant Messaging (IM) service.

* * * * *